Dec. 16, 1924.
R. B. FAGEOL
1,519,399
CLAMPING DEVICE FOR AUTOMOBILE BUMPERS
Filed April 10, 1923   2 Sheets-Sheet 1
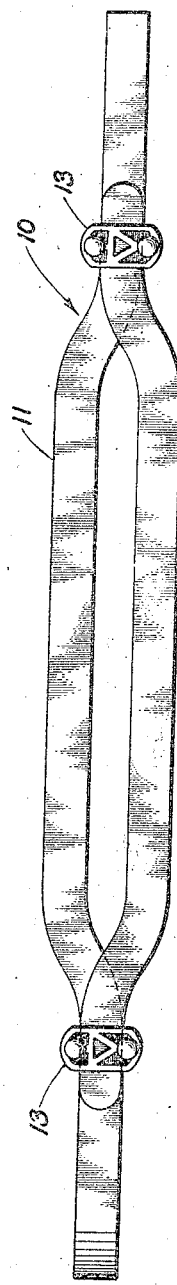
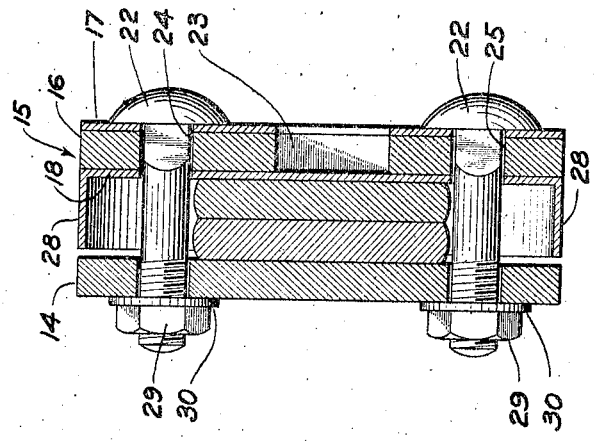
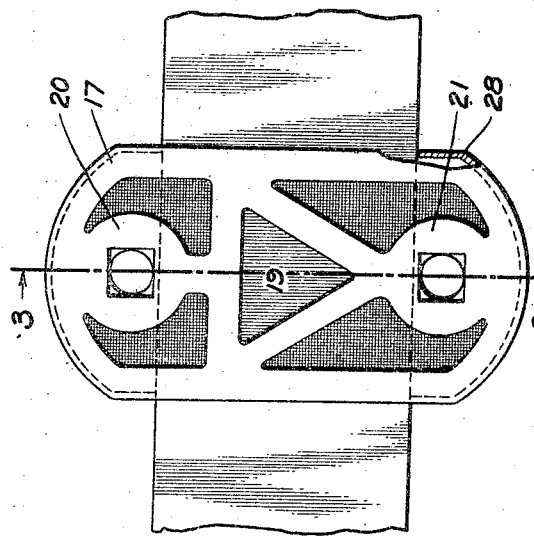
INVENTOR.
ROLLIE B. FAGEOL.
BY Dewey, Strong
Townsend and Loftus
ATTORNEYS.

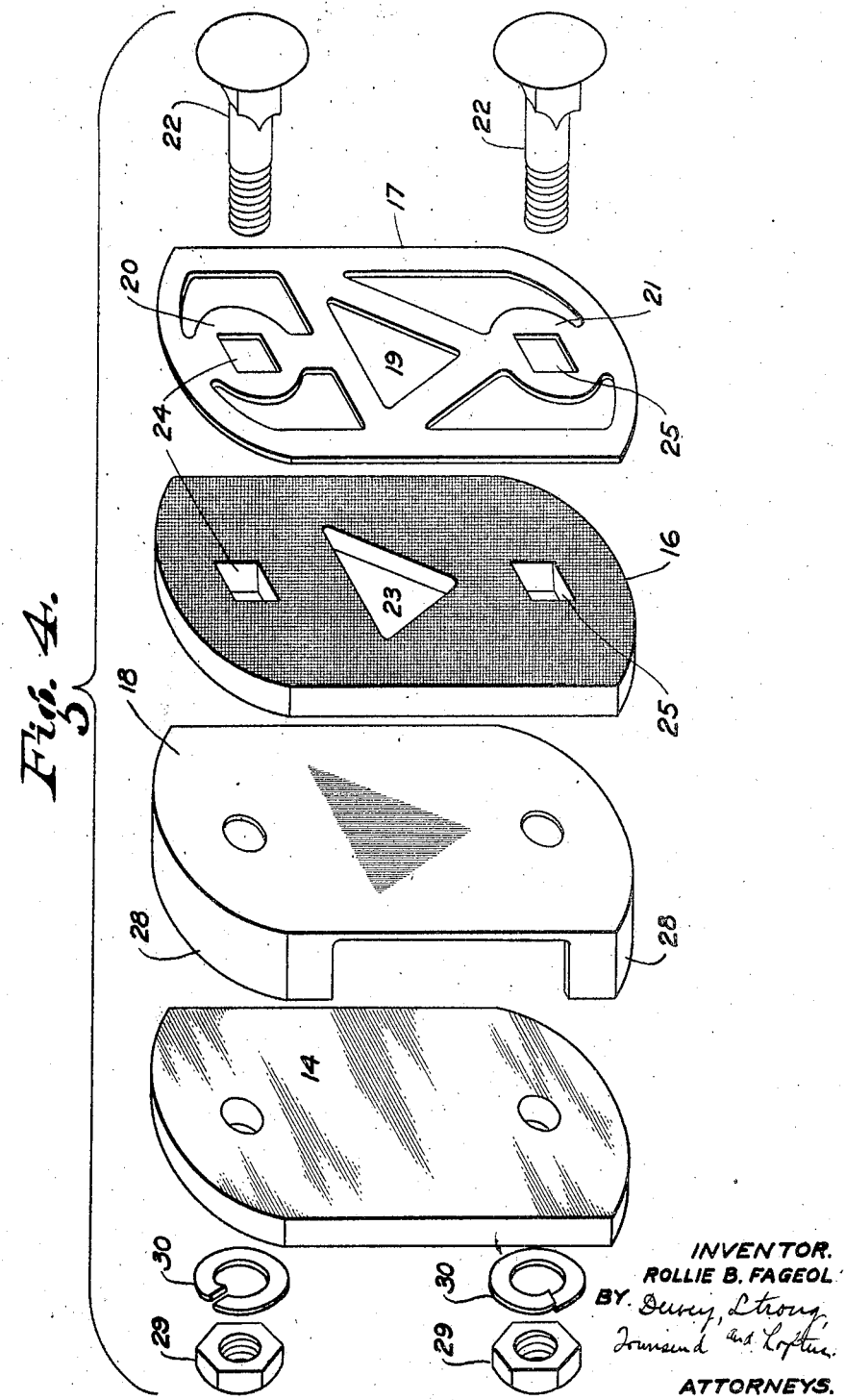

Patented Dec. 16, 1924.

1,519,399

UNITED STATES PATENT OFFICE.

ROLLIE B. FAGEOL, OF OAKLAND, CALIFORNIA, ASSIGNOR TO AMERICAN CHAIN COMPANY, INC., OF BRIDGEPORT, CONNECTICUT, A CORPORATION OF NEW YORK.

CLAMPING DEVICE FOR AUTOMOBILE BUMPERS.

Application filed April 10, 1923. Serial No. 631,077.

*To all whom it may concern:*

Be it known that I, ROLLIE B. FAGEOL, a citizen of the United States, residing at Oakland, county of Alameda, and State of California, have invented new and useful Improvements in Clamping Devices for Automobile Bumpers, of which the following is a specification.

This invention relates to automobile bumpers and particularly pertains to clamps therefor.

At the present time certain types of automobile bumpers are made with overlapping parts which it is necessary to clamp adjustably together while holding said parts in parallel planes and in longitudinal alignment; this being particularly true of bumpers having brackets provided with portions lying flush with the bumper impact bar and with their faces abutting, and also true of bumpers having impact bars made of overlapping strips of flat steel of various configurations. In each event it is necessary to provide a simple and effective clamping means for the various parts.

It is also desirable to embellish the clamping members so as to add finish to the bumper, and this is often done by forming designs on the bumper clamp in contrasting colors, said design of necessity being applied in an expensive hand operation.

It is the principal object of the present invention to provide a clamp for the purpose above designated, which will readily lend itself to color combinations in the design of the clamp, while at the same time producing a clamp which will have great strength, a positive clamping action and being further desirable in that the clamp may be inexpensively manufactured and applied to the bumper.

The present invention contemplates the use of a pair of main clamping plates adapted to be disposed on opposite sides of contiguous bars to be clamped, said plates being supplemented by one or more stencil plates which may be finished in various colors and which, when superposed, will form designs in the contrasting colors of the said plates; the entire structure being held and clamped together by bolts passing through all the plates and holding them in clamped positions upon the opposite sides of the bars.

The invention is illustrated by way of example in the accompanying drawings, in which:

Fig. 1 is a view in front elevation showing a bumper bar of a type having an increased impact area across its center, said bar being formed by two overlapping bar members of flat stock which lie in parallel planes and are clamped together by clamps with which the present invention is particularly concerned.

Fig. 2 is an enlarged view in front elevation showing one of the clamps for the overlapping bumper bars.

Fig. 3 is a view in transverse section through the clamp and bar, as viewed on the line 3—3 of Fig. 2.

Fig. 4 is a schematic drawing showing the various elements of the clamp with which the present invention is concerned, disposed in proper order relative to each other and with the various parts separated to show the manner of assembly.

Referring more particularly to the drawings, 10 indicates an automobile bumper, here shown as formed by complementary bumper bars 11 and 12. These bars overlap each other, and a clamp 13 is provided adjacent to the overlapping end of each of the bars. This clamp is intended to grip the overlapping portions of the bars and to hold the bars against any movement relative to each other.

The bumper shown in the drawing is provided with an increased central impact area, although it will be understood that the present invention is applicable for use when two bars or a bar and bracket are clamped together while lying in parallel planes, and that the clamp will maintain the clamped member in rigid alignment while also preventing longitudinal movement.

Referring more particularly to Figs. 2, 3 and 4, it will be seen that each of the clamps is provided with a back clamping plate 14 and a front clamping unit 15. The unit 15 is here shown as comprising three separate members—a front clamping plate 16, a face plate 17 and a filler 18—the clamping plate being disposed between the face plate and the filler. The front clamping plate 16 and the rear clamping plate 14 are formed from substantially the same stock and, in fact, may be advantageously formed from the same stock as the bumper bars to be clamped. The various plates may be of any desired width, although this width is of necessity greater than the width of the members being clamped.

The face plate 17 is a stamping made from thin gauge metal which may be stencilled out to form any desired design and may also be conveniently nickel-plated, or otherwise finished as desired.

As shown in Fig. 2 the face plate is formed with a triangular shaped, central opening 19 disposed between circular portions 20 and 21 which provide bearing faces for the head of clamping bolts 22. The space around the triangular, central design and the clamping faces 20 and 21 is cut away to disclose the underlying surface of the front clamping plate 16. It is, therefore, desirable to finish the front face of the plate 16 in a contrasting color to the color of the face plate 17.

The front clamping plate 16 is also cut away in the present instance, having a central, triangular hole 23 and a pair of square holes 24 and 25 punched therethrough. The holes 24 and 25 register with similar square holes in the face plate and receive the squared shanks of the bolts 22. The triangular hole in the clamping plate 16 registers with the triangular opening 19 in the face plate, thus permitting a triangular field of the filler 18 to show through openings 19 and 23. This field on the filler may be finished in a color contrasting to that of the face plate and the disclosed face portion of the front clamping plate 16 as it appears through the stenciled portions of the face plate.

The filler 18 may be a stamping or forging formed at its opposite ends with flanges 28. These flanges partially bridge the space between the clamping plates 14 and 16 and tend to give the impression that the clamping structure completely embraces the clamped bars. These flanges terminate with shoulders extending across the edges of the clamp bars and thus tend to hold the entire structure in alignment transversely of the bars.

The rear clamping plate 14 is formed with two circular openings for receiving the round portion of the bolts 22 which pass therethrough and are engaged by nuts 29. Lock washers 30 are interposed between the nuts 29 and the plate 14.

In assembling the clamping device and applying it to a bumper of the class described the plate 17 is first fitted with the bolts 22 and disposed with the square shanks of the bolts extending through the squared openings in the plate. The clamping plate 16 may then be placed on the bolts, thus disposing the triangular opening 23 of the clamping plate 16 in register with the triangular opening 19 of the face plate. The squared shanks of the bolts in this case pass through squared openings in the clamping plate. In this manner these two plates 16 and 17 will be held in positive register. The filler 18 is then positioned on the bolts with its flanged portions 28 extending rearwardly. This assembled unit 15 may then be placed against the outer face of one of the bars to be clamped and with the flanged portions 28 extending transversely of the edges of the two bars to be clamped, thus tending to hold the front clamping unit 15 in its proper position relative to the bars. The back clamping plate 14 may then be applied to the bolts, after which the nuts and lock washers are used in drawing the bolts tight and hold them.

It will thus be seen that by the arrangement here disclosed an effective and positive clamping device is provided for rigidly securing two bars against movement relative to each other, while the clamping device is held in a fixed position relative to the bars being clamped, and that in addition the clamping device may be given embellishments in design and color which may be obtained at a considerable saving of time and labor over methods now in use.

While I have shown the preferred form of my invention as now known to me, it will be understood that various changes might be made in the combination, construction, and arrangement of parts by those skilled in the art, without departing from the spirit of the invention as claimed.

Having thus described my invention, what I claim and desire to secure by Letters Patent is:

1. A device for securing two members in fixed relation to each other, comprising a clamping plate, an intermediate filler plate resting against the face of one of the members and embracing the opposite edges thereof, a second clamping plate resting against the face of the other member, and means for securing all of said members in clamping positions.

2. A clamping device for holding a pair of overlapping members in fixed relation to each other, comprising a filler block embracing the overlapping members and a pair of clamping plates secured upon opposite sides of the filler block and the overlapping members.

3. A clamping device for holding a pair of overlapping members in fixed relation to each other, comprising a filler block embracing the overlapping members, and a pair of clamping plates secured upon opposite sides of the filler block and the overlapping members, one of said clamping plates being stencilled to form a design in conjunction with the disclosed portion of the filler block.

4. A clamping device for holding a pair of overlapping members in fixed relation to each other, comprising a filler block embracing the overlapping members, a pair of clamping plates secured upon opposite sides of the filler block and the overlapping members, one of said clamping plates being stencilled to form a design in conjunction with the disclosed portion of the filler block, and a stencilled face plate disposed over said clamping plate.

5. A clamping device for securing a pair of flat bumper bars in overlapping relation to each other comprising a filler block extending transversely of the face of one bar and having portions at its opposite ends between which the overlapping bars seat and by which they are held in longitudinal alignment, and a clamping plate extending transversely of the outer face of the filler block, a stencil plate disposed over said clamping plate, a back clamping plate and bolts disposed upon opposite sides of the bars and passing through the plates to clamp the bars.

ROLLIE B. FAGEOL.